Feb. 20, 1968 M. WILLIAMS 3,370,258
METHODS OF AND APPARATUS FOR THE PRODUCTION OF
MAGNETIC FIELDS USING SUPERCONDUCTING MAGNETS
Filed Dec. 12, 1966 2 Sheets-Sheet 1

INVENTOR
MICHAEL WILLIAMS
BY
Kinchtein, Kinchtein & Ottinger
ATTORNEYS

United States Patent Office 3,370,258
Patented Feb. 20, 1968

3,370,258
METHODS OF AND APPARATUS FOR THE PRODUCTION OF MAGNETIC FIELDS USING SUPERCONDUCTING MAGNETS
Michael Williams, Watford, England, assignor to The General Electric Company Limited, London, England, a British company
Filed Dec. 12, 1966, Ser. No. 600,956
Claims priority, application Great Britain, Dec. 10, 1965, 52,566/65
6 Claims. (Cl. 335—216)

ABSTRACT OF THE DISCLOSURE

An intense magnetic field is produced within a tube of superconductive material by arranging flux-carrying separable core parts along the tube axis, with their inner ends together, cooling the tube to the superconducting state and then drawing the core parts outwards so as to extend the magnetic flux within the tube interior. The core withdrawal may be effected by balanced withdrawal of constituent core parts, and the cores may be provided by an electromagnet.

---

Figure 1:
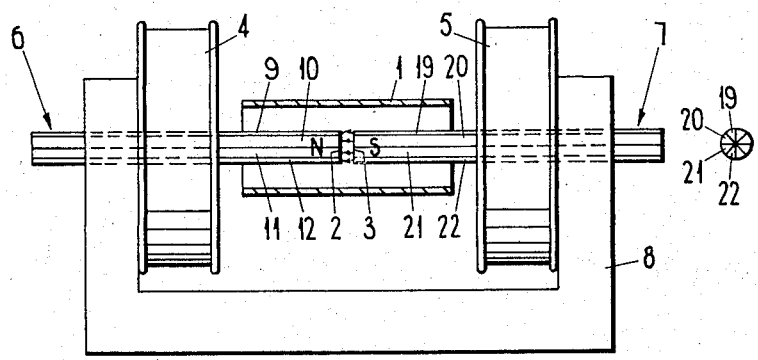

This invention relates to methods of and apparatus for the production of intense magnetic fields using superconducting magnets, that is to say using bodies formed of superconductive material maintained below the critical temperature whilst carrying circulating electric currents which set up the magnetic fields by virtue of which the bodies act as magnets.

One object of the invention is to provide a novel and convenient method of producing a strong magnetic field within a space of appreciable volume, and a further object is to provide a method of magnetising a superconducting body.

According to the invention, a method of producing an intense magnetic field within a space of appreciable volume comprises the steps of supporting along the axis of a tube of superconductive material separable magnetic core parts carrying magnetic flux which is thereby caused to pass through the interior of the tube, the inner ends of said core parts being close together or in contact, then effecting the transformation of the tube to the superconducting state, and then, whilst the tube is maintained in the superconducting state, drawing the core parts outwards with respect to the tube ends so as to separate said inner ends.

In some cases the core parts within the tube may be formed of soft iron and the remainder of the magnet core linking the separable core parts outside the superconductive tube can be wholly or partly of permanent magnet form. In this case the flux changes resulting from separation of the core parts set up circulating currents in the superconducting tube which maintain the magnetic flux substantially constant in the space between the core parts. To reduce any possible undesirable demagnetising of the permanent magnet, it is however preferable for a keeper to be applied across the permanent magnet part of the core externally of the tube after the superconductive tube is cooled and before the core parts within the tube are separated.

In other cases, the core parts may form part of an electromagnet, which, subsequent to the superconductive material of the tube being transformed to the superconducting state, is preferably slowly deenergised before their withdrawal by effecting a smooth reduction of the current in its windings, thus setting up electric currents in the superconducting tube which circulate around its axis and which maintain the magnetic flux trapped within it substantially constant.

In an alternative method, electric currents which circulate around its axis may be set up in the tube by symmetrically and slowly and smoothly withdrawing the pole pieces from the tube whilst current is flowing in the windings of the electromagnet and subsequent to the tube being transformed to the superconducting state.

If required, the core parts may be left partially within the superconducting tube and the space between them used as a working space into which bodies can be introduced to be influenced by the magnetic field.

If, however, the core parts are completely withdrawn, the superconducting tube will be left in a strongly magnetised condition and can be removed for use elsewhere. The method thus affords a quick method of producing a superconducting magnet.

The withdrawal of the core parts should be effected both symmetrically, and smoothly and slowly. The smooth and slow withdrawal reduces the possibility of flux jumps occurring, whilst the symmetrical withdrawal serves to balance the large mechanical forces generated. For enhancing the symmetry of withdrawal and reducing the unbalance of forces, the core parts are preferably similarly constructed each in a plurality of separable lengths a number at a time of which, being the same number for each core part, are simultaneously withdrawn. Each number may be unity, but preferably each consists of two or more pairs with each member of a pair a mirror image of the other member with respect to the core part assembly axis and each length in the one core part having a symmetrically opposed length in the other core part.

Preferably for obtaining very high flux densities the core parts form part of an electromagnet and the following sequence of steps is effected:

(a) The core parts are brought together within the tube of superconductive material whilst the latter is in the normal condition and the electromagnet windings are unenergised, (b) The electromagnet windings are then energised, (c) The tube is then cooled to render it superconducting, (d) The electromagnet windings are then slowly deenergised, (e) The core parts are then slowly drawn apart along the tube axis.

The invention will be further described in connection with the example of it illustrated in FIGURES 1, 2 and 3 of the accompanying part-sectional drawings, which show different stages in the carrying out of it, and FIGURE 4 which shows a magnetised cylindrical superconducting magnet resulting from it.

Figure 2:
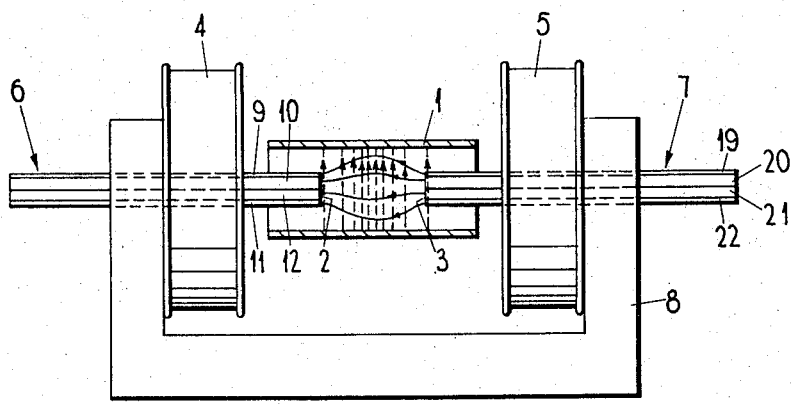
Figure 3:
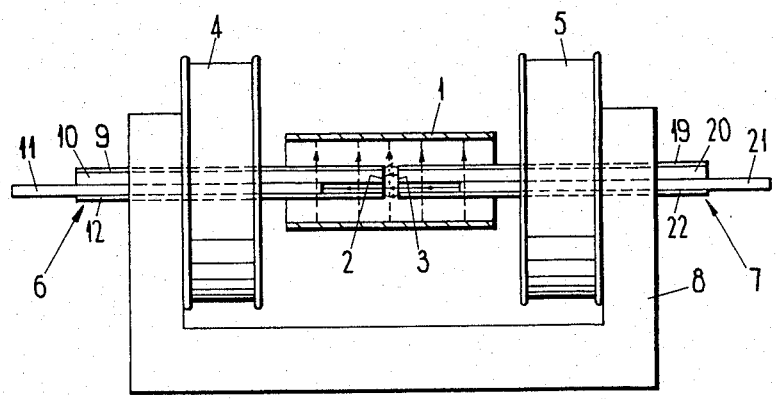

FIGURES 1, 2 and 3 of the drawings show a tube in the form of a cylindrical sleeve 1 of superconductive material in which are inserted, so as to be in close end-to-end proximity, separable core parts 6, 7 of an electromagnet, which parts are arranged to lie along the cylindrical axis. The electromagnet comprises energising coils 4, 5 arranged externally of the sleeve 1 on the core parts 6, 7, the latter being of soft-iron and supported at their ends by a soft-iron yoke 8 which completes the magnetic circuit.

Each of the soft-iron core parts 6, 7 is made up of a number of longitudinal pieces 9, 10, 11, 12, etc. and 19, 20, 21, 22, etc. respectively (hereinafter referred to simply as rods) fitted together, as illustrated by the core section shown to the right of the core part 7 in FIGURE 1.

With the sleeve 1 in the normal state the inner ends 2, 3 of the core parts 6, 7 are firstly brought into contact within the sleeve 1. The coils 4, 5 of the electromagnet are then energised so that a dense flux is created right through the core parts 6, 7. The sleeve 1 is then cooled to the superconducting state by means of a specially shaped cryostat within which it is immersed in liquid helium. The current in the coils 4, 5 of the electromagnet is then slowly reduced to zero and the core parts 6, 7 are slowly and symmetrically drawn apart either each as one piece or bit by bit by the similar withdrawal of corresponding rods in the two core parts.

This deenergisation and withdrawal causes induced electric currents to circulate round the sleeve 1 of such a nature as to conserve the magnetic flux traversing the sleeve.

FIGURE 2 shows the apparatus of FIGURE 1 as it would be if the core parts 6, 7 were drawn apart each in one piece. The dotted arrows are intended to illustrate the general direction of flow of electric currents so induced in the superconducting tube 1.

FIGURE 3 shows in section apparatus as in FIGURE 1 but as it would be in the mid-process of symmetrically drawing apart the core parts 6, 7 rod by rod as above described. The corresponding rods 11, 21 in the parts 6, 7 are shown drawn apart so extending the region of magnetic field to include that vacated by their inner ends. The dotted arrows are intended to illustrate the general direction of flow of electric currents so induced in the superconducting tube 1 and the concentration of these dotted arrows is intended to be indicative of the current density of these electric currents in the various parts of the tube, the greater this concentration the higher being the current density.

Figure 4:
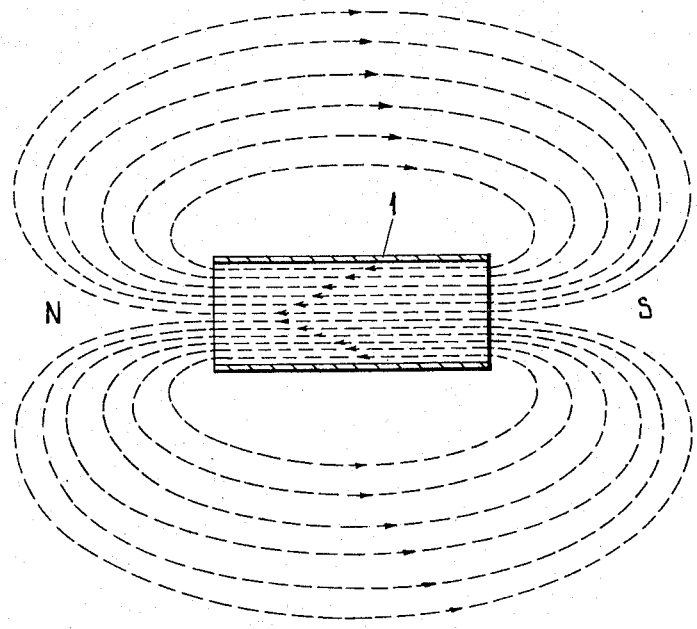

FIGURE 4 shows in section the free superconducting tube magnet 1 which is left if the core parts 6, 7 are withdrawn completely and the electromagnet is removed.

By way of example, the tube 1 to be magnetised may be formed of 200 mesh niobium and tin powders mixed to give the approximate composition $Nb_3Sn$, compacted into the required tubular form at 10 tons/in.$^2$ pressure, and sintered at 925° C. for two hours in an argon atmosphere at a pressure of 5 mm. Hg to form the tube.

Using good materials for the core parts 6, 7 of the electromagnet and utilising these at low temperatures, superconducting magnets containing flux densities of from 10–35 kg. may be produced.

The superconductive tube will in general need mechanical support around the outside because when magnetised it will be subject to considerable forces; for this purpose a close fitting tube of titanium (this being a material of a similar thermal coefficient of expansion to niobium-tin compound) can be fitted round the tube.

I claim:

1. A method of producing an intense magnetic field within a space of appreciable volume comprising the steps of supporting along the axis of a tube of superconductive material separable magnetic core parts carrying magnetic flux which is thereby caused to pass through the interior of the tube, the inner ends of which core parts are adjacent one another, effecting the transformation of the tube to the superconducting state and then, whilst the tube is maintained in this state, drawing the core parts outwards with respect to the tube ends so as to separate said inner ends.

2. A method according to claim 1, wherein the said separable magnetic core parts are of a magnetic material readily able to carry induced magnetic flux and wherein the remainder of the magnet core linking the separable core parts outside the superconductive tube is of permanent magnet form.

3. A method according to claim 1, wherein the said separable magnetic core parts are of a magnetic material readily able to carry induced magnetic flux and form part of an electromagnet and wherein subsequent to the said transformation of the tube to the superconducting state and prior to the said drawing of the core parts outwards the electromagnet energising current is slowly and smoothly reduced so as to induce electric currents in the material of the superconducting tube which circulate around the tube axis and maintain the magnetic flux trapped within the tube substantially constant.

4. A method according to claim 3, wherein the said core parts are similarly constructed each in a plurality of separable lengths a number at a time of which, being the same number for each core part, are simultaneously withdrawn.

5. A method according to claim 1, wherein the said core parts are similarly constructed each in a plurality of separable lengths a number at a time of which, being the same number for each core part, are simultaneously withdrawn.

6. A method of magnetising a cylinder of superconductive material, wherein the cylinder is used as said tube in a method according to claim 1, wherein the separable magnetic core parts are completely withdrawn from the cylinder in the magnetisation stage, and the cylinder with magnet flux trapped therein is removed from the apparatus for use elsewhere.

References Cited

UNITED STATES PATENTS

| | | | |
|---|---|---|---|
| 3,174,083 | 3/1965 | Swartz | 335—216 |
| 3,253,192 | 5/1966 | Rinderer | 335—216 |
| 3,262,024 | 7/1966 | Swartz | 335—216 |

BERNARD A. GILHEANY, *Primary Examiner.*

GEORGE HARRIS, *Examiner.*